US008700250B1

(12) United States Patent
Curtis et al.

(10) Patent No.: US 8,700,250 B1
(45) Date of Patent: Apr. 15, 2014

(54) AIRPORT TRANSPORTATION SYSTEM

(75) Inventors: Vicki Curtis, Stanwood, WA (US);
Elizabeth John, San Francisco, CA (US); Adam William Hoenle, Loveland, OH (US); Raphael Anthony Zammit, Cincinnati, OH (US)

(73) Assignee: The Boeing Company, Chicago, IL (US)

( * ) Notice: Subject to any disclaimer, the term of this patent is extended or adjusted under 35 U.S.C. 154(b) by 92 days.

(21) Appl. No.: 13/421,005

(22) Filed: Mar. 15, 2012

(51) Int. Cl.
*G01C 1/00* (2006.01)

(52) U.S. Cl.
USPC .......................................................... 701/25

(58) Field of Classification Search
USPC .......................................................... 701/25
See application file for complete search history.

(56) References Cited

U.S. PATENT DOCUMENTS

| | | | |
|---|---|---|---|
| 6,135,228 A | 10/2000 | Asada et al. | |
| 6,374,155 B1* | 4/2002 | Wallach et al. | 700/245 |
| 6,825,752 B2* | 11/2004 | Nahata et al. | 340/5.64 |
| 7,383,107 B2 | 6/2008 | Fehr et al. | |
| 2002/0196131 A1* | 12/2002 | McCarthy et al. | 340/425.5 |
| 2003/0093187 A1* | 5/2003 | Walker | 701/1 |
| 2005/0267786 A1* | 12/2005 | Lang | 705/5 |
| 2007/0222595 A1* | 9/2007 | Motteram et al. | 340/572.1 |
| 2008/0046298 A1* | 2/2008 | Ben-Yehuda et al. | 705/6 |
| 2009/0157302 A1* | 6/2009 | Tashev et al. | 701/206 |
| 2011/0015816 A1* | 1/2011 | Dow et al. | 701/23 |

OTHER PUBLICATIONS

Quicky Freestyle/Aspire Replacement Parts >>Motor & Motor Mount, 1 page, 2013 available online @ http://www.quickie-wheelchairs.com/wheelchair-parts/sunrise-medical/quickie-freestyle-aspire/base/motors/motor-motor-mount, last accessed Aug. 11, 2013.*
Quickie Freestyle FRONT, 1 page, 2013 available online @ http://lib.store.yahoo.net/lib/used-electric-wheelchairs/quickie-freestyle-power-wheelchair-used-power-chair_3.jpg, last accessed Aug. 11, 2013.*
Quickie Freestyle BACK, 1 page, 2013 available online @ http://lib.store.yahoo.net/lib/used-electric-wheelchairs/quickie-freestyle-power-wheelchair-used-power-chair_3.jpg, last accessed Aug. 11, 2013.*
"ACRP Report 10; Innovations for Airport Terminal Facilities," Airport Cooperative Research, Federal Aviation Administration, Transportation Research Board, copyright 2008, 80 Pages.
Pineau et al., "SmartWheeler: A Robotic Wheelchair Test-Bed for Investigating New Models of Human-Robot Interaction," 2007 AAAI Spring Symposium, Mar. 2007, 6 Pages.

(Continued)

*Primary Examiner* — Behrang Badii
*Assistant Examiner* — Daniel L Greene
(74) *Attorney, Agent, or Firm* — Yee & Associates, P.C.

(57) ABSTRACT

A method and apparatus comprising a mobile platform, a movement system associated with the mobile platform, a location system, and a navigator. The mobile platform is configured to hold a passenger. The movement system is configured to move the mobile platform. The location system is configured to identify a location of the mobile platform. The navigator is configured to identify flight information for the passenger. The navigator is further configured to generate a route to a gate for the passenger using the flight information. The navigator is further configured to control the movement system to move the mobile platform along the route using the location of the mobile platform.

22 Claims, 9 Drawing Sheets

(56) References Cited

OTHER PUBLICATIONS

Fattah et al., "Smart Airports: Transforming Passenger Experience to Thrive in the New Economy," Cisco Internet Business Solutions Group, Cisco Systems, Inc., Jul. 2009, 16 Pages.

Gomi et al., "Developing Intelligent Wheelchairs for the Handicapped," Assistive Technology and Artificial Intelligence, Lecture Notes in Computer Science, copyright 1998, vol. 1458/1998, 24 Pages.

Wong et al., "Service Innovation by a World-Class Airport: The Case of Singapore's Changi Airport," institute of Systems Science, National University of Singapore, Sep. 2008, 6 Pages.

Simpson, "Smart wheelchairs: A literature review," Journal of Rehabilitation Research & Development, Jul. 2005, vol. 42, No. 4, pp. 423-436.

Cheng et al., "The Development of the Automatic Lane Following Navigation System for the Intelligent Robotic Wheelchair," IEEE International Conference on Fuzzy Systems, Jun. 2011, 7 Pages.

\* cited by examiner

AIRPORT TRANSPORTATION SYSTEM

BACKGROUND INFORMATION

1. Field

The present disclosure relates generally to mobile platforms for transporting people and, in particular, to mobile platforms used in airports to transport passengers. Still more particularly, the present disclosure relates to a method and apparatus for the navigation of mobile platforms for automatically transporting passengers from one destination to another destination within an airport.

2. Background

In transporting people through an airport, accommodations are made for individuals who cannot walk long distances. Equipment and personnel are provided to assist people, such as passengers, in getting to the correct destination. Further, the route to get from one destination to another destination may be difficult to navigate. Area maps or information regarding gates are not readily accessible for some passengers.

The current solutions for transporting people to destinations within an airport include the use of transportation systems such as moving sidewalks, trams, and shuttles. For some passengers, these transportation systems may not provide sufficient assistance or may be intimidating to disabled passengers.

Further, for passengers with mobility difficulties, services are provided by airlines or other organizations to transport these types of passengers to a desired destination. These services may include the use of a wheelchair or a cart. With these types of services, airline or airport personnel are needed to push the wheelchair or operate the cart. Access to wheelchairs or carts may be limited at different airports. Further, using airline or airport personnel to transport passengers through the airport may use more equipment, personnel, or other resources than desired.

The number of aging passengers that use airport services is steadily increasing. As passengers age, mobility of the passengers often declines. Many passengers who do not use a wheelchair on a daily basis may need assistance to get from one location to another location within an airport, depending on the distance traveled. As more and more passengers develop mobility issues, more resources are devoted to move these passengers through the airport.

With the rise of the aging population, the need for an efficient and cost-effective internal airport transportation system is apparent. Therefore, it would be desirable to have a method and apparatus that takes into account at least some of the issues discussed above, as well as other possible issues.

SUMMARY

In one illustrative embodiment, an apparatus comprises a mobile platform, a movement system associated with the mobile platform, a location system, and a navigator. The mobile platform is configured to hold a passenger. The movement system is configured to move the mobile platform. The location system is configured to identify a location of the mobile platform. The navigator is configured to identify flight information for the passenger. The navigator is further configured to generate a route to a gate for the passenger using the flight information. The navigator is further configured to control the movement system to move the mobile platform along the route using the location of the mobile platform.

In another illustrative embodiment, a self-propelled passenger platform comprises a mobile platform, a movement system associated with the mobile platform, a location system, and a navigator. The mobile platform is configured to hold a passenger. The movement system is configured to move the mobile platform. The location system is configured to identify a location of the mobile platform. The navigator is configured to identify flight information for the passenger. The navigator is further configured to identify points of interest. The navigator is further configured to generate a route to a gate and a set of points of interest in response to user input selecting the set of points of interest. The navigator is further configured to control the movement system to move the mobile platform along the route using the location of the mobile platform.

In yet another illustrative embodiment, a method of operating a self-propelled passenger platform is present. Flight information is identified for a passenger. A route from a location of a mobile platform to a gate identified is generated from the flight information. Operation of a movement system associated with the mobile platform is controlled such that the mobile platform moves along the route.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the different illustrative embodiments recognize and take into account that using carts or wheelchairs operated by airport personnel to transport passengers to gates may use more resources than desired. For example, the cost for airport personnel to drive carts or push wheelchairs may result in undesired operating expenses. Further, a shortage of airport personnel to transport passengers using carts or wheelchairs may cause passengers to be late or to miss a flight.

The illustrative embodiments also recognize and take into account that allowing passengers to operate carts may be undesirable. For example, the ability of the passengers to properly operate carts and follow rules may not meet a desired level of safety in the airport. As a result, the illustrative embodiments recognize and take into account that providing carts or motorized wheelchairs to passengers may be undesirable for safety concerns, insurance costs, and other factors. Additionally, allowing passengers to operate carts may not provide as efficient navigation as desired. For example, passengers may be unfamiliar with the airport and unable to find destinations efficiently.

Thus, the illustrative embodiments provide a method and apparatus for transporting passengers in an airport. In one illustrative embodiment, an apparatus comprises a mobile platform, a movement system, a location system, and a navigator. The mobile platform is configured to hold a passenger. The movement system is associated with the platform and configured to move the mobile platform. The location system is configured to identify a location of the mobile platform. The navigator is configured to identify flight information for the passenger, generate a route to a gate for the passenger, and control the movement system to move the mobile platform along the route using the location of the mobile platform.

Figure 1:
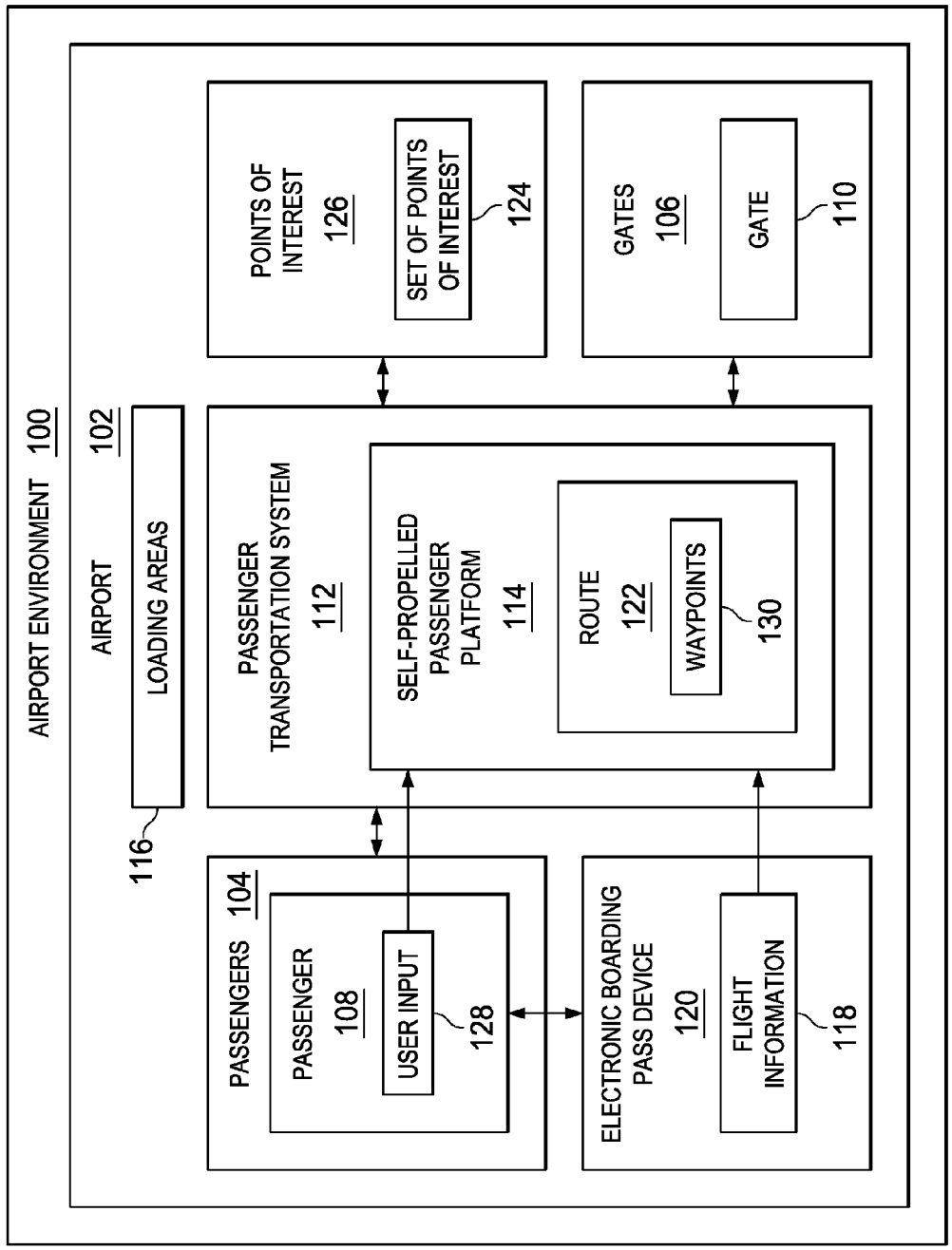
FIG. 1 is an illustration of a block diagram of an airport environment in accordance with an illustrative embodiment.

With reference now to the figures, and in particular, with reference to FIG. 1, an illustration of a block diagram of an airport environment is depicted in accordance with an illustrative embodiment. In this illustrative example, airport environment 100 includes airport 102.

Passengers 104 may move through airport 102 to reach gates 106 for travel. In moving through airport 102 to gates 106, passengers 104 may have different amounts of mobility. For example, passenger 108 in passengers 104 may require assistance to travel to gate 110. In these illustrative examples, passenger transportation system 112 is configured to move passenger 108 to gate 110 in a more efficient manner as compared to currently used transportation systems.

For example, passenger transportation system 112 includes self-propelled passenger platform 114. Passenger 108 may board self-propelled passenger platform 114 at a number of loading areas 116 in airport 102. As used herein, a "number of" when used with reference to items means one or more items. For example, a number of loading areas 116 is one or more of loading areas 116.

Loading areas 116 may be located in locations, such as, for example, without limitation, an entrance to airport 102, an airline counter, an area just inside of security, and other suitable locations. In these illustrative examples, loading areas 116 also may provide a storage location, a charging facility, and other systems required for operation of self-propelled passenger platform 114.

Self-propelled passenger platform 114 is configured to identify flight information 118 for passenger 108. Flight information 118 is information about a flight for passenger 108. Flight information 118 may include, for example, without limitation, at least one of a flight number, a gate, an airline, a departure time, a boarding time, and other suitable information.

Flight information 118 may be identified in a number of different ways. For example, passenger 108 may have electronic boarding pass device 120 with flight information 118 stored on electronic boarding pass device 120. In these illustrative examples, self-propelled passenger platform 114 may be configured to communicate with electronic boarding pass device 120 to receive flight information 118 about passenger 108 from electronic boarding pass device 120.

In other illustrative examples, flight information 118 may be identified using a printed ticket for passenger 108. In this example, a scanner may be used as an input device to scan the printed ticket for passenger 108. Of course, other forms of information may be used to identify flight information 118 for passenger 108.

In these illustrative examples, electronic boarding pass device 120 is a hardware device and may take a number of different forms. For example, without limitation, electronic boarding pass device 120 may be a plastic card with a circuit embedded therein, a mobile phone, a laptop computer, a table computer, a flash drive, and other suitable types of devices.

Electronic boarding pass device 120 may communicate with self-propelled passenger platform 114 using a wireless communications link or a physical communications link such as a network cable or port in the self-propelled passenger platform 114. Flight information 118 may be updated as changes in this information occur. For example, if gate 110 changes for passenger 108, that change will be received by self-propelled passenger platform 114. In these illustrative examples, self-propelled passenger platform 114 may receive updated information through a wireless communications link.

Additionally, self-propelled passenger platform 114 is configured to generate route 122 to gate 110 for passenger 108 using flight information 118. Self-propelled passenger platform 114 then moves along route 122 through airport 102 to reach gate 110 for passenger 108.

This movement occurs without the need for passenger 108, airport personnel, or other human operators to control movement of self-propelled passenger platform 114. In particular, a human operator is not needed to steer or navigate self-propelled passenger platform 114 along route 122 to reach gate 110.

Additionally, self-propelled passenger platform 114 is also configured to identify a set of points of interest 124 from points of interest 126 for passenger 108. Set of points of interest 124 may be identified from user input 128. User input 128 may be generated by passenger 108, a profile for passenger 108, or other information. In some cases, user input 128 may be stored in a data processing system at airport 102 or in a data processing system in a remote location. User input 128 may also be used to identify flight information 118 about passenger 108.

In other words, user input 128 may be generated prior to passenger 108 reaching airport 102, while passenger 108 is at airport 102, prior to passenger 108 boarding self-propelled passenger platform 114, or while passenger 108 is riding on self-propelled passenger platform 114.

A set, as used herein, means one or more items. For example, set of points of interest 124 means one or more points of interest.

Points of interest 126 are points of interest within airport 102 in these illustrative examples. Points of interest 126 may include, for example, without limitation, at least one of a newsstand, a restaurant, a restroom, a gift shop, a location in airport 102 selected by passenger 108, and other locations in airport 102.

As used herein, the phrase "at least one of", when used with a list of items, means different combinations of one or more of the listed items may be used and only one of each item in the list may be needed.

For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these illustrative examples, route 122 is comprised of waypoints 130. A waypoint is a reference point in physical space that is used by self-propelled passenger platform 114 for purposes of navigation. In these illustrative examples, a waypoint in waypoints 130 for route 122 may be selected for a point of interest in set of points of interest 124. In other words, a point of interest may be represented in route 122 as a waypoint in waypoints 130 for route 122.

Self-propelled passenger platform 114 is self-navigating and takes passenger 108 to gate 110. In this manner, passenger 108 may travel to gate 110 with the assistance of self-propelled passenger platform 114. Passenger 108 may travel to gate 110 without requiring assistance of another human operator. Further, self-propelled passenger platform 114 also may stop at set of points of interest 124 if any are identified based on user input 128. Passenger 108 does not need to know what path to take to reach gate 110 or a point of interest in set of points of interest 124.

Figure 2:
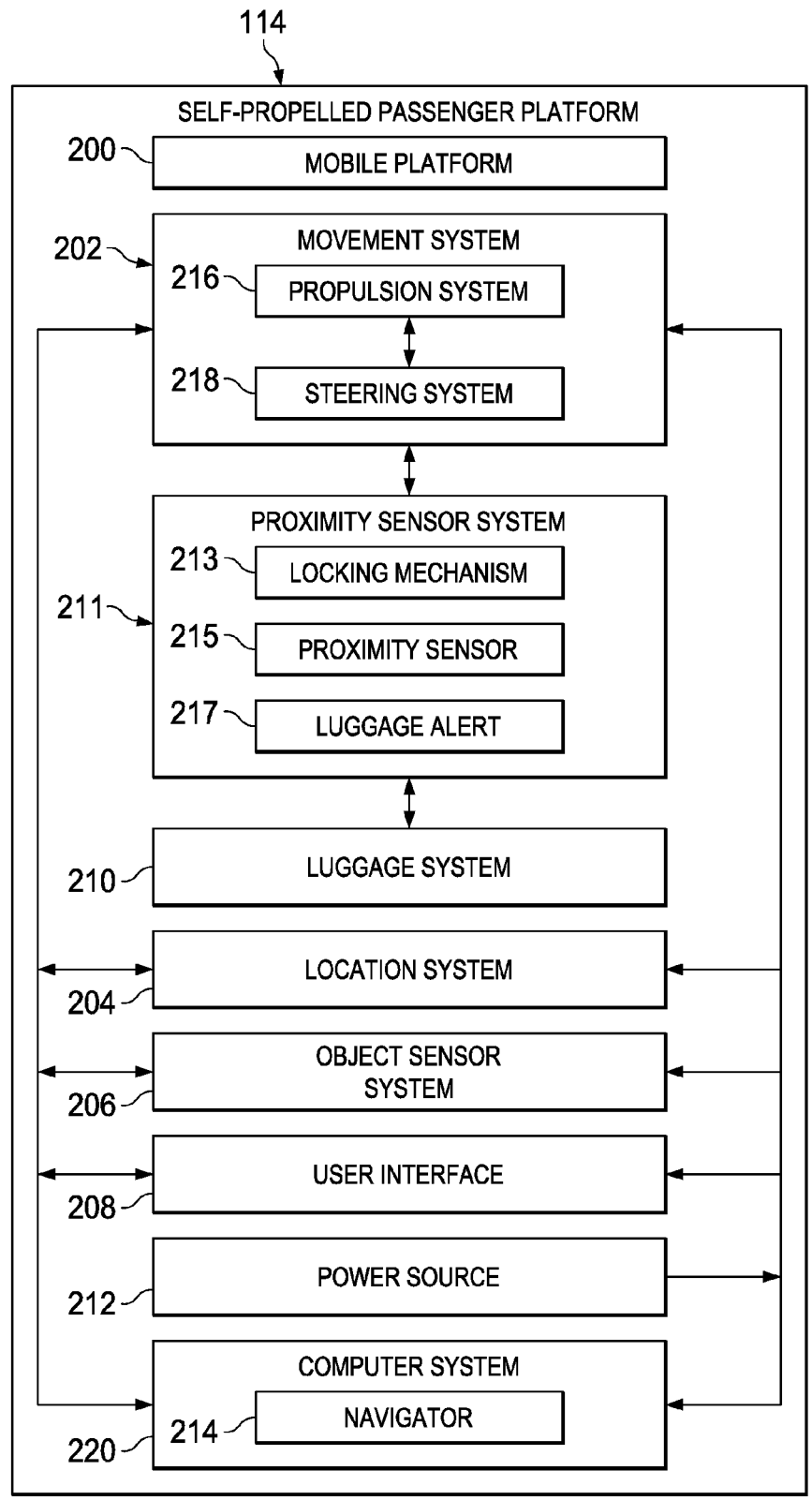
FIG. 2 is an illustration of a block diagram of a self-propelled passenger platform in accordance with an illustrative embodiment.

Turning now to FIG. 2, an illustration of a block diagram of a self-propelled passenger platform is depicted in accordance with an illustrative embodiment. In this illustrative example, examples of components that may be found in self-propelled passenger platform 114 are depicted.

In this illustrative example, self-propelled passenger platform 114 includes mobile platform 200, movement system 202, location system 204, object sensor system 206, user interface 208, luggage system 210, proximity sensor system 211, power source 212, and navigator 214. Of course, other components may be used in addition to or in place of the illustrative components.

Mobile platform 200 is a moveable platform on which other components for self-propelled passenger platform 114 may be associated. When one component is "associated" with another component, the association is a physical association in these depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, mobile platform 200 may have wheels, tracks, or other suitable mechanisms for movement. In these illustrative examples, mobile platform 200 may take a number of different forms. For example, without limitation, mobile platform 200 may be selected from at least one of a wheelchair, a cart, a two-wheeled self-balancing personal transport platform, and other suitable types of platforms for use in transporting one or more of passengers 104 in airport 102.

Movement system 202 is associated with mobile platform 200 and provides movement for mobile platform 200. As depicted, movement system 202 comprises propulsion system 216 and steering system 218. Propulsion system 216 is configured to cause movement of mobile platform 200. In these illustrative examples, propulsion system 216 may be a number of electric motors connected to a number of wheels in mobile platform 200.

Steering system 218 is configured to change the direction in which mobile platform 200 moves. In this illustrative example, steering system 218 may be a number of controllers configured to control the number of electric motors. By controlling the number of electric motors, steering system 218 may control the direction of movement of mobile platform 200.

Location system 204 is associated with mobile platform 200 and is configured to identify a location of self-propelled passenger platform 114. In these illustrative examples, location system 204 is configured to identify a location within airport 102 or around airport 102.

In this illustrative example, location system 204 may be selected from at least one of a global positioning system (GPS) receiver, a radio frequency identification (RFID) reader, and other suitable types of location systems. If a radio frequency identification reader is used, radio frequency identification tags may be placed at pre-selected locations in airport 102. These locations may include, for example, points of interest 126, gates 106, and other suitable locations. The radio frequency identification tags may be used as waypoints 130 for navigation.

As depicted, object sensor system 206 is associated with mobile platform 200 and is configured to detect objects. For example, object sensor system 206 is configured to generate object detection information and send that information to navigator 214 for use in avoiding objects. The objects may be, for example, without limitation, other self-propelled passenger platforms or mobile platforms, passengers, airport personnel, spills, luggage, and other objects that should be avoided.

In particular, object sensor system 206 may be configured to detect objects that may be in the path or direction of travel of self-propelled passenger platform 114. In these illustrative examples, object sensor system 206 may include at least one of a camera, an ultrasonic sensor, an infrared light sensor, and other suitable types of sensors.

In this illustrative example, user interface 208 is associated with mobile platform 200 and is configured to receive user input from a passenger. User interface 208 also may display information to a passenger or other user of self-propelled passenger platform 114. In these illustrative examples, user interface 208 may be a display device, a touch screen, a keyboard, buttons, and other hardware devices associated with mobile platform 200.

In some illustrative examples, user interface 208 may not be physically associated with mobile platform 200. Instead, user interface 208 may be a mobile phone, a tablet computer, or other suitable device for communication with navigator 214.

Luggage system 210 is associated with mobile platform 200 and is configured to hold luggage and other items. In these illustrative examples, luggage system 210 may be, for example, without limitation, a rack, a compartment in mobile platform 200, a cart connected to mobile platform 200, and other suitable structures.

In this illustrative example, proximity sensor system 211 is configured to identify whether a passenger is present on, or within a desired distance of, self-propelled passenger platform 114. Proximity sensor system 211 includes proximity sensor 215 and locking mechanism 213. Proximity sensor 215 may be, for example, without limitation, a radio frequency identification receiver. Proximity sensor 215 may detect a presence of a radio frequency identification tag given to the passenger. This radio frequency identification tag may be stored in an electronic boarding pass device, such as electronic boarding pass device 120, or may be stored in another device associated with the passenger.

When a passenger is present on self-propelled passenger platform 114, movement system 202 may engage. When proximity sensor 215 in proximity sensor system 211 detects a change indicating that the passenger has left self-propelled passenger platform 114 beyond a desired distance, locking mechanism 213 may engage. Proximity sensor system 211 may monitor luggage system 210. This monitoring may be used to detect the presence of luggage or other items that indicate the passenger will be returning to self-propelled passenger platform 114.

In these illustrative examples, locking mechanism 213 is configured to prevent unauthorized movement of self-propelled passenger platform 114. Further, locking mechanism 213 is configured to prevent access to luggage system 210 by unauthorized users.

In these illustrative examples, an unauthorized user may be any user that is not associated with flight information 118 from electronic boarding pass device 120 for passenger 108. Electronic boarding pass device 120 may include a radio frequency identification tag. This radio frequency identification tag may include a unique identifier that is associated with the passenger.

For example, when a passenger leaves self-propelled passenger platform 114 to visit a restroom, proximity sensor 215 in proximity sensor system 211 may no longer detect the presence of the radio frequency identification tag in electronic boarding pass device 120 when the passenger travels outside of the range of the radio frequency identification. When the radio frequency identification tag is no longer detected by proximity sensor 215, locking mechanism 213 in proximity sensor system 211 may disable or lock self-propelled passenger platform 114 in a manner that avoids self-propelled passenger platform 114 from being used by another person.

As another example, if a passenger leaves self-propelled passenger platform 114 to enter a restaurant, locking mechanism 213 may protect luggage or other personal items in luggage system 210 from theft.

In these illustrative examples, when a passenger returns to self-propelled passenger platform 114, the radio frequency identification tag in electronic boarding pass device 120 is detected and proximity sensor system 211 may reactivate movement system 202 in self-propelled passenger platform 114. In other words, self-propelled passenger platform 114 may be configured to resume movement once a passenger is reseated on self-propelled passenger platform 114 without requiring input from the passenger.

In other illustrative examples, mobile platform 200 may be configured to wait a desired amount of time after proximity sensor 215 detects that a passenger has left self-propelled passenger platform 114. This desired amount of time may be provided by airport personnel or input by the user into user interface 208. For example, if a passenger would like to visit a restaurant for a certain amount of time, that user may be allowed to enter that amount of time in user interface 208 before exiting self-propelled passenger platform 114.

When proximity sensor 215 no longer detects that a passenger is present on or near self-propelled passenger platform 114 for a desired amount of time, mobile platform 200 uses location system 204 and object sensor system 206 to return self-propelled passenger platform 114 to a desired loading area within airport 102. In other words, when a passenger is no longer using self-propelled passenger platform 114 and has no intent to return to self-propelled passenger platform 114, self-propelled passenger platform 114 returns to a loading station automatically.

Proximity sensor system 211 is further configured to alert the passenger when luggage or other items remain in luggage system 210. For example, when the passenger reaches the desired gate and leaves self-propelled passenger platform 114, luggage alert 217 may alert the passenger that luggage remains in luggage system 210.

Luggage alert 217 may be, for example, without limitation, a visual alert displayed on a display screen, an alarm, a text message sent to the mobile device of the passenger, an alert sent to airport personnel at the gate, or some other suitable alert. In these illustrative examples, luggage alert 217 may be configured to occur when self-propelled passenger platform 114 arrives at the gate, after the passenger has moved away from self-propelled passenger platform 114 by a certain distance, or both.

Further, luggage system 210 may remain locked by locking mechanism 213 until the passenger has returned to retrieve the items left in luggage system 210. Luggage alert 217 with locking mechanism 213 may help the passenger remember luggage and other items stored in luggage system 210. Further, luggage alert 217 with locking mechanism 213 may protect items left in luggage system 210 from theft.

As depicted, power source 212 is associated with mobile platform 200. Power source 212 is configured to provide power to various components in self-propelled passenger platform 114. These components may include, for example, without limitation, movement system 202, location system 204, object sensor system 206, user interface 208, and navigator 214.

Power source 212 may take various forms. For example, power source 212 may be at least one of a battery, an electromagnetic induction device, and/or some other suitable source of power.

In these illustrative examples, navigator 214 is associated with mobile platform 200. Navigator 214 may take a number of different forms. Navigator 214 may be implemented in computer system 220 for self-propelled passenger platform 114 in these illustrative examples.

Navigator 214 can be implemented in software, hardware, or a combination of the two. When software is used, the operations performed by the components may be implemented in the program code configured to be run on a processor unit. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a field programmable logic array, a field programmable gate array, and other suitable hardware devices.

Additionally, the processes may be implemented in organic components integrated with inorganic components and/or may be comprised entirely of organic components excluding a human being.

As depicted, navigator 214 is configured to identify flight information 118 for passenger 108, generate route 122 to gate 110 for passenger 108 using the flight information 118, and control movement system 202 to move mobile platform 200 along route 122 using the location of mobile platform 200. Further, set of points of interest 124 may be identified from points of interest 126 in airport 102 from user input 128. In addition, navigator 214 may alter route 122, start and stop, or perform other actions to avoid objects along route 122. For example, in response to receiving object detection information from object sensor system 206 and identifying objects in the direction of travel from the object detection information, navigator 214 may alter route 122 to avoid these objects.

Further, navigator 214 also may start and stop in response to user input received through user interface 208. However, navigator 214 may not be configured to allow passenger 108 to steer or change the direction of movement of mobile platform 200. This type of restriction may be present for safety reasons, airport regulations, and other reasons.

Further, navigator 214 also may allow passenger 108 to change sets of points of interest 124 while mobile platform 200 moves along route 122 to gate 110. Navigator 214 may be configured to alter route 122 for passenger 108 when a point of interest in set of points of interest 124 is selected. These changes may change waypoints 130 in route 122. Additionally, navigator 214 may automatically update route 122 in response to gate changes for passenger 108. In yet another example, one or more additional passengers may use self-propelled passenger platform 114. In this example, navigator 214 may generate route 122 such that each passenger reaches their gate in time for their flight. If route 122 cannot take all of the passengers to their gates in time, then a change in passenger loading, a change in points of interests, or other changes may be made.

The illustration of airport environment 100 with passenger transportation system 112 in FIG. 1 and the components for self-propelled passenger platform 114 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although airport environment 100 is illustrated as the environment in which passenger transportation system 112 may be implemented, passenger transportation system 112 may be implemented in other environments. In one illustrative example, passenger transportation system 112 may be implemented in a station or other location for boarding a ship, a train, a bus, and other suitable types of transportation. The gates may be gates at which passengers board these types of vehicles.

Further, passenger transportation system 112 also may be implemented in other types of facilities other than airport 102. For example, passenger transportation system 112 may be implemented in a shopping mall, an office complex, or other suitable locations where a person may need assistance traveling to various points of interest or locations.

As another example, self-propelled passenger platform 114 may include other components in addition to or in place of the ones illustrated. In addition, some components illustrated for self-propelled passenger platform 114 in FIG. 2 may be omitted in some implementations. For example, luggage system 210 may be absent in some implementations of self-propelled passenger platform 114. In still other illustrative examples, self-propelled passenger platform 114 also may include an advertisement system in the form of appliques or advertisements displayed on a display device in user interface 208.

In yet another example, movement along route 122 by self-propelled passenger platform 114 may include movement to waypoints on different levels of an airport environment. For example, self-propelled passenger platform 114 may be configured for use on moveable walkways, escalators, elevators, or may be configured to move in a vertical direction.

Figure 3:
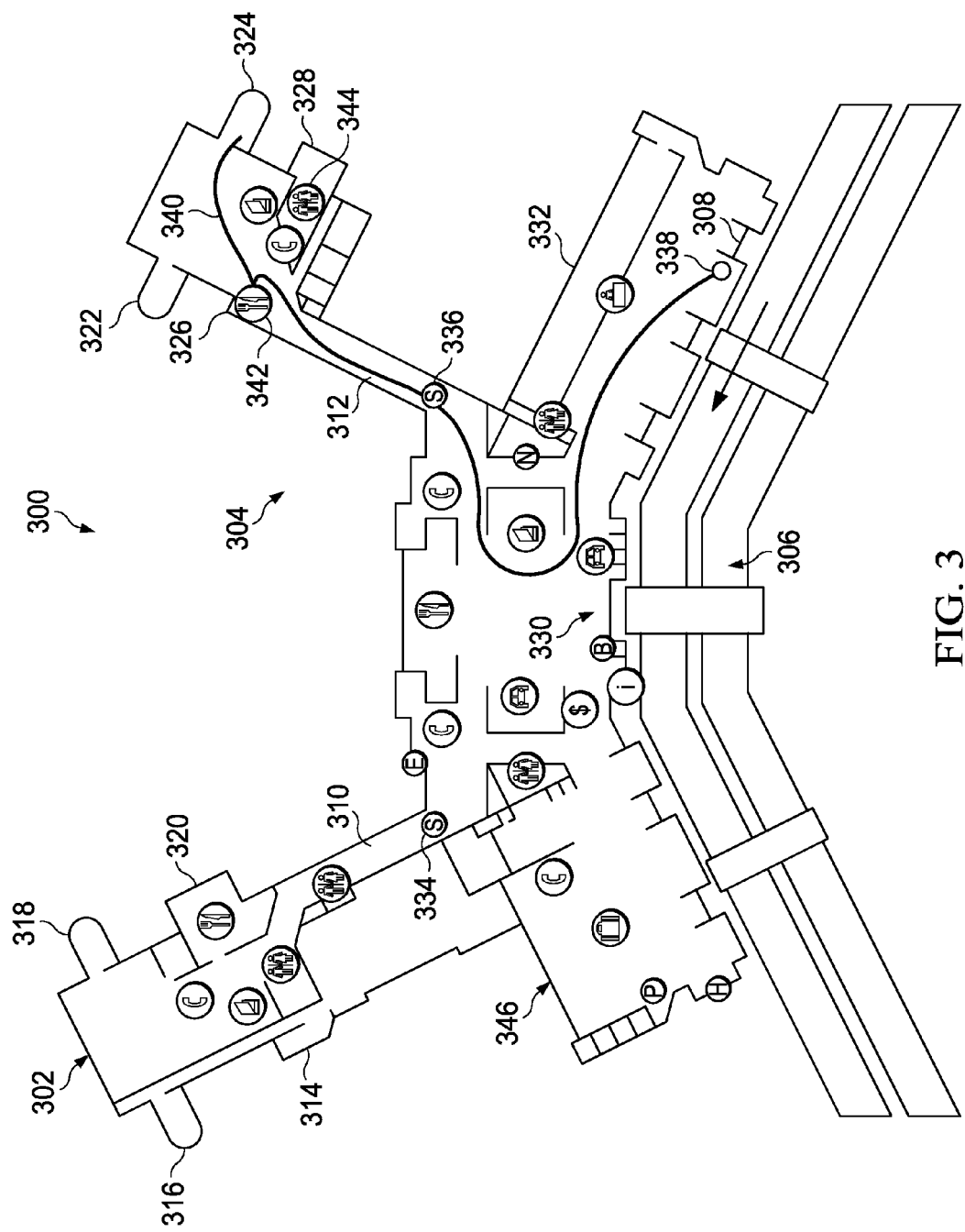
FIG. 3 is an illustration of an airport environment in accordance with an illustrative embodiment.

Turning now to FIG. 3, an illustration of an airport environment is depicted in accordance with an illustrative embodiment. In this depicted example, airport environment 300 includes airport 302. Airport 302 is an example of one implementation for airport 102 shown in block form in FIG. 1.

In this illustrative example, airport 302 includes passenger transportation system 304. Passenger transportation system 304 may be used to move passengers who need assistance from loading areas, such as loading area 306, loading area 308, loading area 310, and loading area 312 to gates such as gate 314, gate 316, gate 318, gate 320, gate 322, gate 324, gate 326, and gate 328 in airport 302.

As depicted, loading area 306 is located at main entrance 330 and loading area 308 is located near ticket counters 332. Loading area 310 is located after security check point 334 and loading area 312 is located after security check point 336.

In these illustrative examples, self-propelled passenger platforms, such as self-propelled passenger platform 114, may be located at these loading areas. For example, a passenger may check in at ticket counters 332 and board self-propelled passenger platform 338 at loading area 308.

As depicted, self-propelled passenger platform 338 identifies flight information for the passenger. In particular, self-propelled passenger platform 338 identifies gate 324 as the destination or endpoint for the passenger. Self-propelled passenger platform 338 generates route 340 to gate 324 using the flight information.

Additionally, route 340 also may include a set of points of interest for the passenger. The set of points of interest are included as waypoints in route 340. In this illustrative example, the set of points of interest include security checkpoint 336, restaurant 342, and restroom 344. These points of interest are locations where self-propelled passenger platform 338 will stop along route 340 for the passenger.

In these illustrative examples, security checkpoint 336 is automatically selected for the passenger without user input from the passenger. The selection of security checkpoint 336 is based on route 340.

In some cases, the passenger may provide user input to select a particular location or type of security checkpoint depending on the particular implementation. For example, if more than one security checkpoint is present in airport 302 to reach gate 324, user input may be received to select the particular security checkpoint as a point of interest.

Of course, the passenger may have self-propelled passenger platform 338 stop at other points along route 340. Further, the passenger also may add, delete, or otherwise change points of interest selected for route 340. In response to these changes in input by the passenger, self-propelled passenger platform 338 may make changes to route 340 to take into account the changes in the set of points of interest.

In these illustrative examples, the passenger is able to control self-propelled passenger platform 338 in a limited fashion. For example, the passenger is able to make changes in points of interest, start self-propelled passenger platform 338, and stop self-propelled passenger platform 338. In some cases, a passenger may even be able to cause self-propelled passenger platform 338 to speed up to a pre-selected speed limit, or slow down. Self-propelled passenger platform 338 may be configured to operate within a desired range of speeds.

In these illustrative examples, however, the passenger is unable to steer self-propelled passenger platform 338. Of course, in some cases, other operators, such as airport personnel, may be able to override the limitation in steering self-propelled passenger platform 338. For example, if a security issue has developed in one location in an airport, airport personnel may divert self-propelled passenger platform 338 from route 122 or use self-propelled passenger platform 338 without a passenger.

Further, if a gate change occurs while the passenger is traveling along route 340 or sitting in self-propelled passenger platform 338 at gate 324, self-propelled passenger platform 338 may generate a new route and transport the passenger to the new gate.

The illustration of airport environment 300 and the examples of the operation of self-propelled passenger platform 338 in FIG. 3 are not meant to imply limitations to the manner in which different illustrative embodiments may be implemented. For example, other areas in addition to or in place of the loading areas depicted in FIG. 3 may be used. For example, a loading area may be present at or near the gates to transport passengers de-boarding flights to baggage area 346. In still other illustrative examples, passengers on self-propelled passenger platform 338 may pass through separate checkpoints from other passengers who do not need assistance.

In yet another illustrative example, a passenger may board a self-propelled passenger platform at loading area 306 located at main entrance 330. In this instance, the self-propelled passenger platform may generate a route to ticket counters 332 and then to the gate including any points of interest selected by the passenger.

Figure 4:
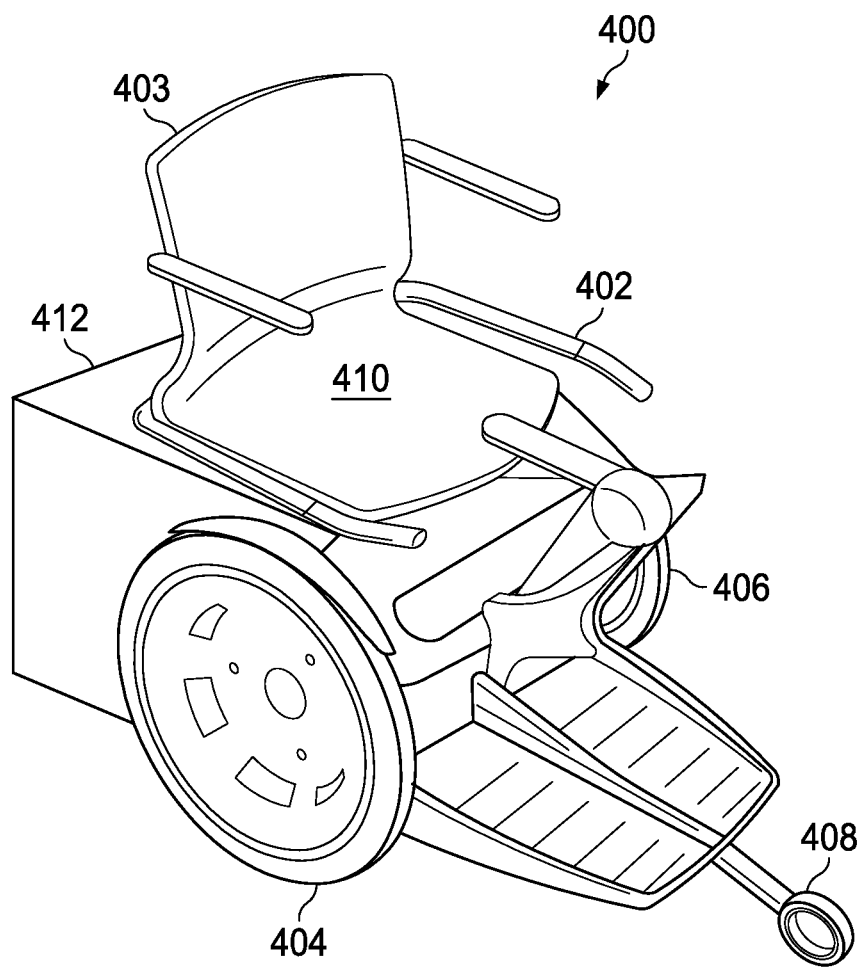
FIG. 4 is an illustration of a self-propelled passenger platform in accordance with an illustrative embodiment.

Turning now to FIG. 4, an illustration of a self-propelled passenger platform is depicted in accordance with an illustrative embodiment. As depicted, self-propelled passenger platform 400 is an example of a physical implementation for self-propelled passenger platform 114 shown in block form in FIG. 1 and FIG. 2, and self-propelled passenger platform 338 in FIG. 3.

As depicted, self-propelled passenger platform 400 comprises mobile platform 402. In this illustrative example, mobile platform 402 takes the form of wheelchair 403. Mobile platform 402 has wheel 404, wheel 406, and wheel 408. In this illustrative example, a passenger may sit in chair 410 on self-propelled passenger platform 400. As depicted, mobile platform 402 also includes luggage system 412.

Figure 5:
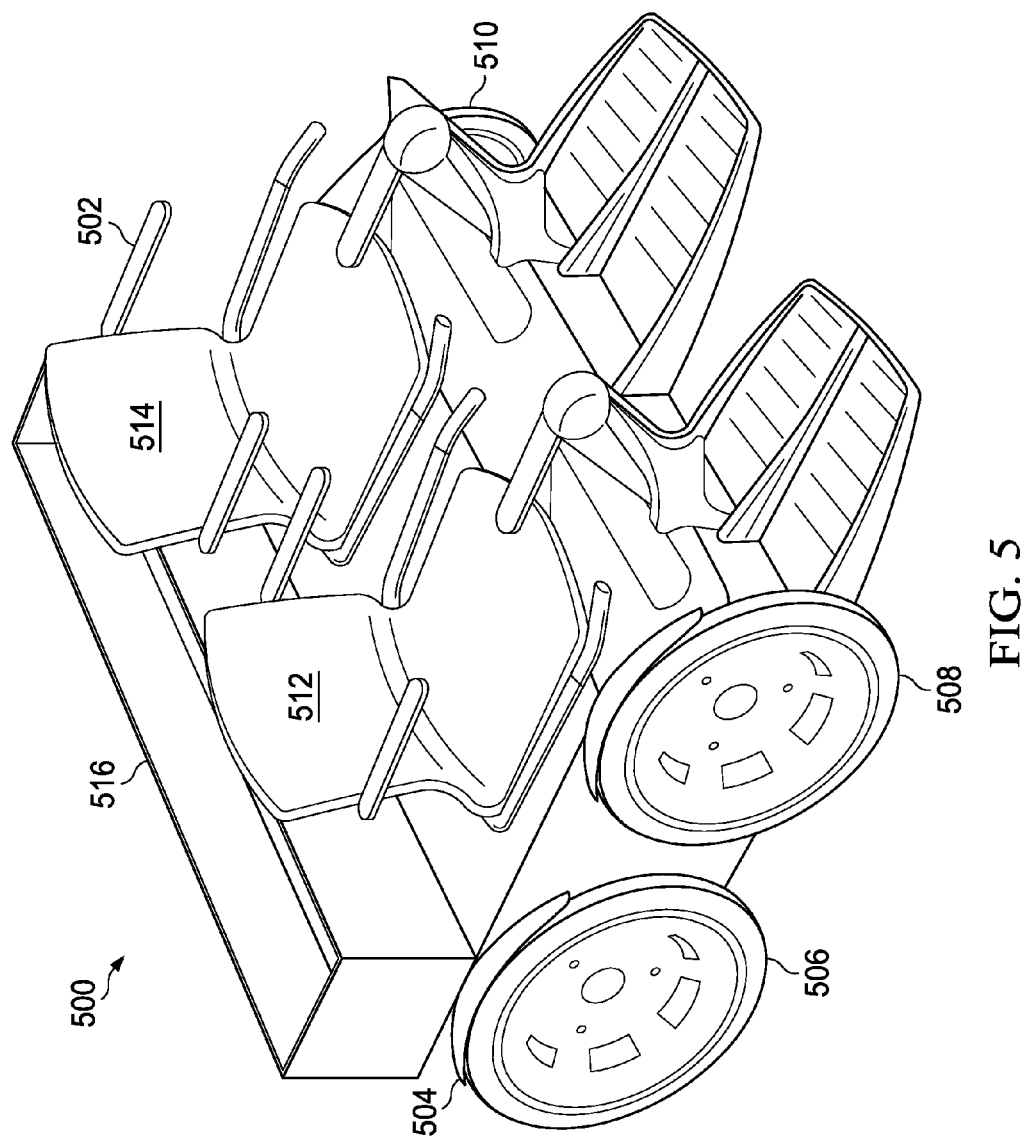
FIG. 5 is an illustration of another example of a self-propelled passenger platform in accordance with an illustrative embodiment.

With reference now to FIG. 5, an illustration of another example of a self-propelled passenger platform is depicted in accordance with an illustrative embodiment. In this illustrative example, self-propelled passenger platform 500 is another example of a physical implementation for self-propelled passenger platform 114 in FIG. 1 and FIG. 2, and self-propelled passenger platform 338 in FIG. 3.

In this illustrative example, self-propelled passenger platform 500 comprises mobile platform 502. In this particular example, mobile platform 502 takes the form of cart 504. Mobile platform 502 has wheel 506, wheel 508, wheel 510, and another wheel not shown in this illustration.

Further, mobile platform 502 includes seat 512 and seat 514. In this illustrative example, mobile platform 502 is able to transport up to two passengers. As depicted, mobile platform 502 also includes luggage system 516.

The illustrations of self-propelled passenger platform 400 in FIG. 4 and self-propelled passenger platform 500 in FIG. 5 are only presented as examples of some implementations for self-propelled passenger platform 114 shown in block form in FIG. 1 and FIG. 2 and is not meant to imply limitations to the manner in which other self-propelled passenger platforms may be implemented.

For example, in other implementations, a self-propelled passenger platform may carry more than two passengers. For example, without limitation, a self-propelled passenger platform may carry four passengers, six passengers, or some other number of passengers. In still other illustrative examples, self-propelled passenger platform may use tracks rather than wheels, may have more than four wheels, or otherwise be configured in some other suitable manner. Further, the self-propelled passenger platform may have less than four wheels and may be configured to house a passenger in a seated position, a standing position, a semi-seated position, or some combination thereof.

Figure 6:
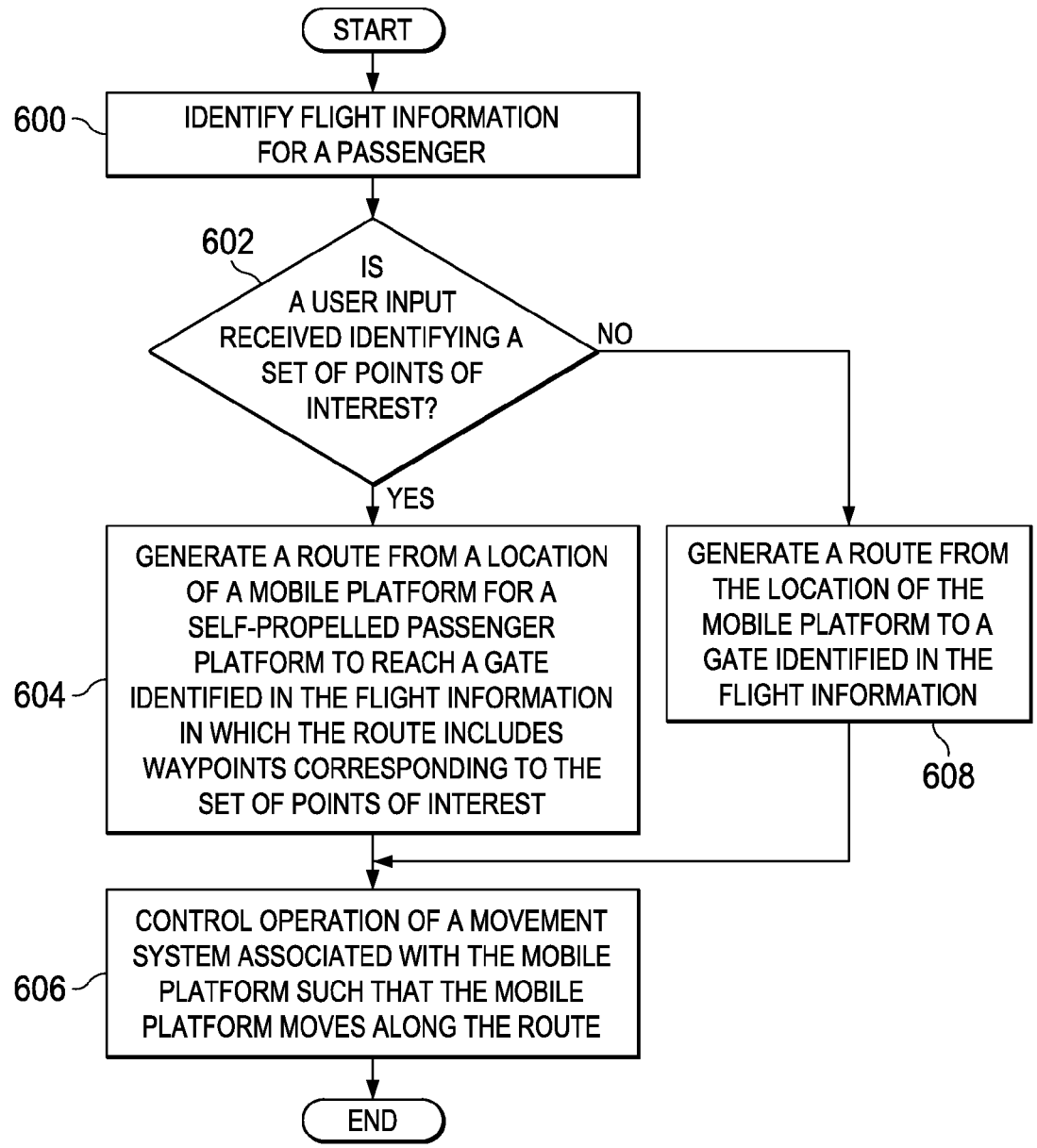
FIG. 6 is an illustration of a flowchart of a process for operating a self-propelled passenger platform in accordance with an illustrative embodiment.

Turning now to FIG. 6, an illustration of a flowchart of a process for operating a self-propelled passenger platform is depicted in accordance with an illustrative embodiment. The process illustrated in FIG. 6 may be implemented in self-propelled passenger platform 114 in airport environment 100 in FIG. 1 and FIG. 2.

The process begins by identifying flight information for a passenger (operation 600). Operation 600 may be implemented in a number of different ways. For example, the flight information may be received from an electronic flight boarding pass device, a computer system used by airport personnel at a ticket counter, or some other suitable source. The flight information identified in operation 600 may include a gate or gates.

A determination is made as to whether a user input is received identifying a set of points of interest (operation 602). If a user input is received identifying a set of points of interest, a route is generated from a location of a mobile platform for a self-propelled passenger platform to reach a gate identified in the flight information in which the route includes waypoints corresponding to the set of points of interest (operation 604).

The process then controls operation of a movement system associated with the mobile platform such that the mobile platform moves along the route (operation 606) with the process terminating thereafter.

With reference again to operation 602, if a user input is not received identifying a set of points of interest, the process generates a route from the location of the mobile platform to a gate identified in the flight information (operation 608). The process then proceeds to operation 606 as described above.

Figure 7:
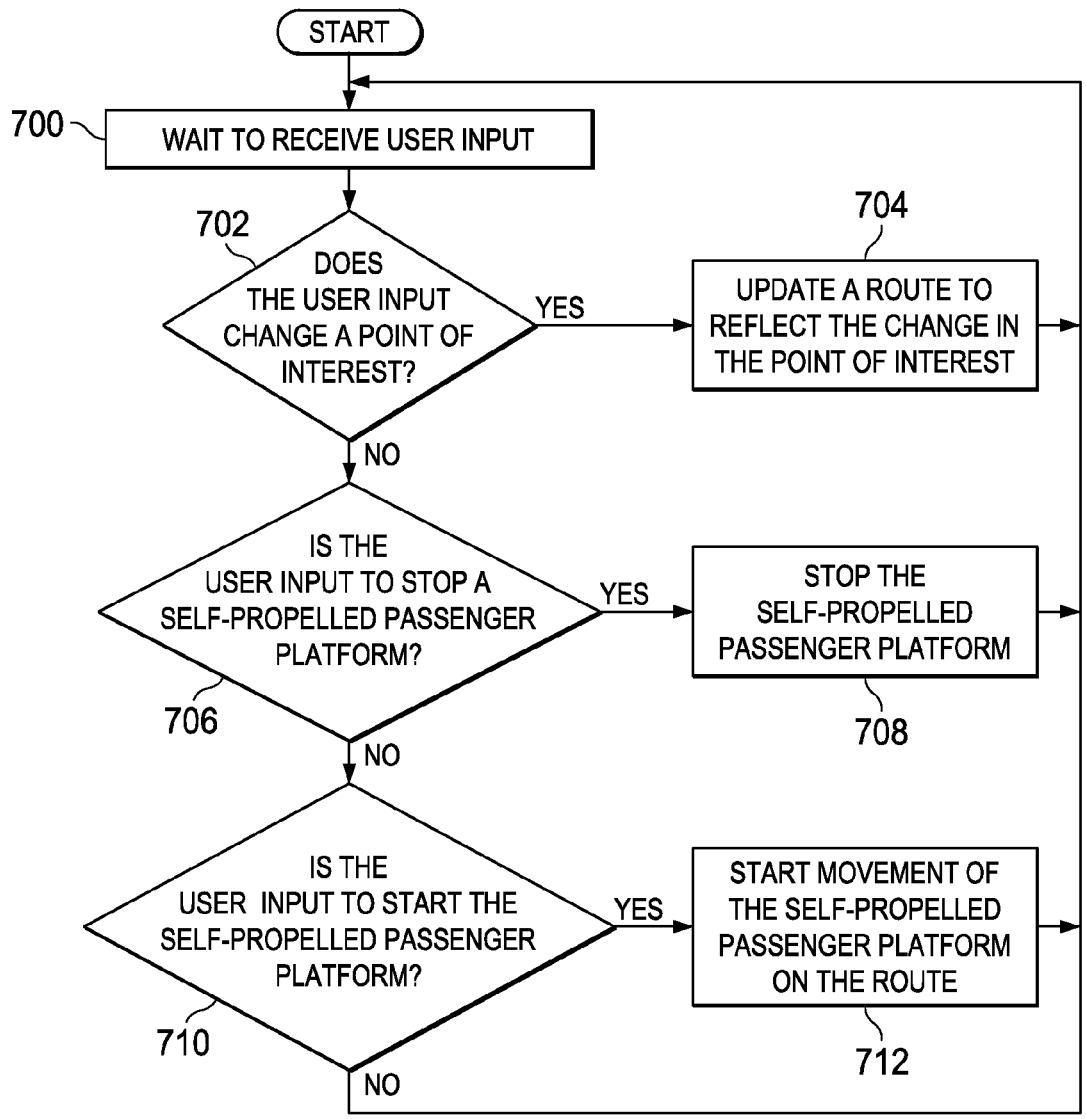
FIG. 7 is an illustration of a flowchart of a process for controlling operation of a self-propelled passenger platform in accordance with an illustrative embodiment.

Turning now to FIG. 7, an illustration of a flowchart of a process for controlling operation of a self-propelled passenger platform is depicted in accordance with an illustrative embodiment. This process may be implemented in self-propelled passenger platform 114 in FIG. 1 and FIG. 2. In particular, the process may be implemented using user interface 208 and navigator 214 in self-propelled passenger platform 114.

The process begins by waiting to receive user input (operation 700). When user input is received, a determination is made as whether the user input changes a point of interest (operation 702).

If the user input changes a point of interest, a route is updated to reflect the change in the point of interest (operation 704) with the process then returning to operation 700. The change in the point of interest may add a point of interest, remove a point of interest, select a different point of interest, or make some other change. One or more waypoints in the route are changed to reflect the change in the point of interest in operation 704.

Turning back to operation 702, if the user input does not change the point of interest, a determination is made as to whether the user input is to stop a self-propelled passenger platform while the self-propelled passenger platform is moving along the route (operation 706). If the user input is to stop the self-propelled passenger platform, the process stops the self-propelled passenger platform (operation 708). In stopping the self-propelled passenger platform, the self-propelled passenger platform may stop on the route, move to a wall, or move to some other suitable location. The process then returns to operation 700 as described above.

With reference again to operation 706, if the user input does not stop the self-propelled passenger platform, a determination is made as to whether the user input is to start the self-propelled passenger platform while the self-propelled passenger platform is stationary (operation 710).

If the user input is to start the self-propelled passenger platform, the process then starts movement of the self-propelled passenger platform on the route (operation 712) with the process then returning to operation 700.

With reference again to operation 710, if the user input is not to start the self-propelled passenger platform, the process returns to operation 700 as described above.

Figure 8:
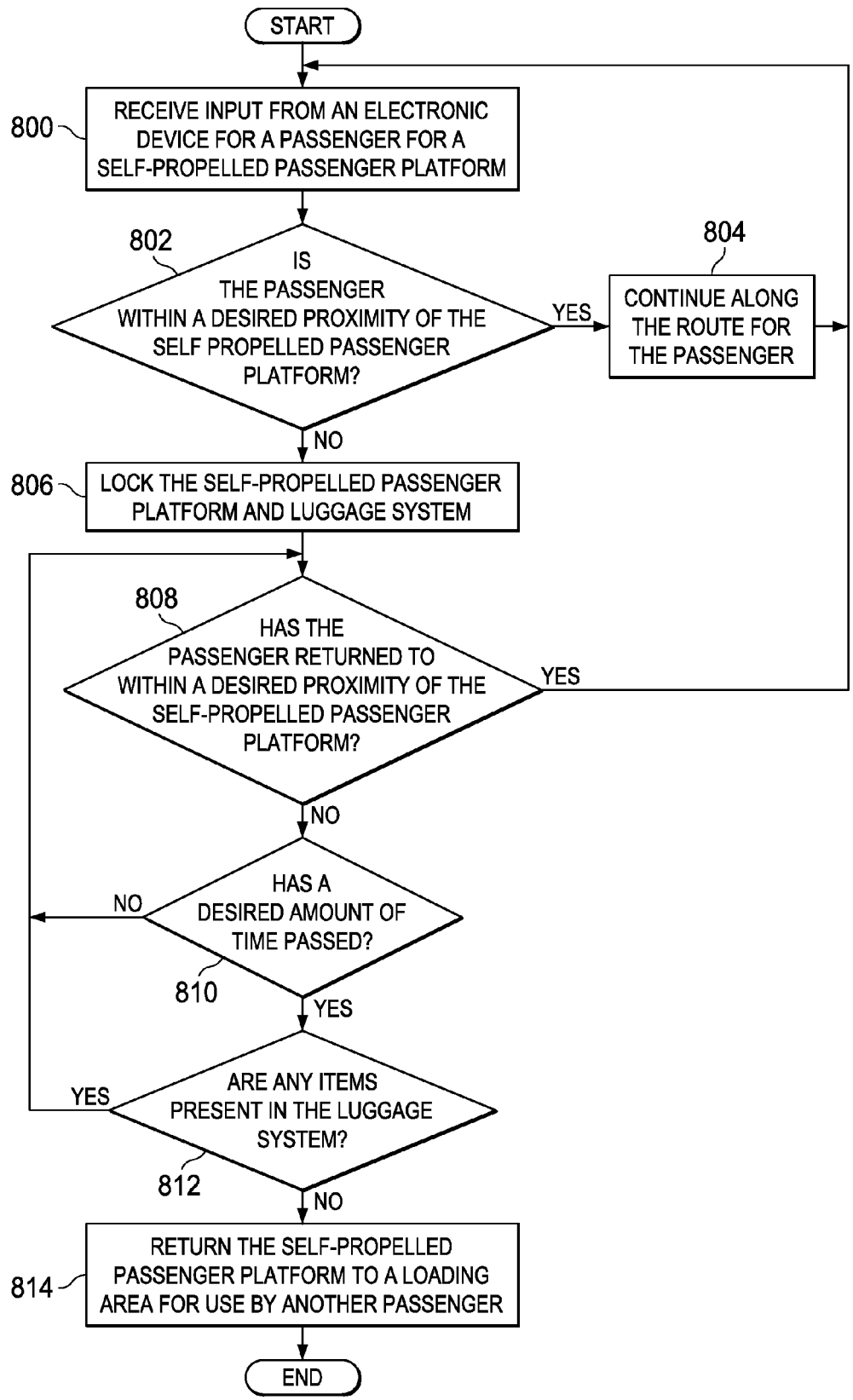
FIG. 8 is an illustration of a flowchart of a process for detecting the proximity of a passenger to a self-propelled passenger platform in accordance with an illustrative embodiment.

Turning now to FIG. 8, an illustration of a flowchart of a process for detecting the proximity of a passenger to a self-propelled passenger platform is depicted in accordance with an illustrative embodiment. This process may be implemented in self-propelled passenger platform 114 in FIG. 1 and FIG. 2. In particular, the process may be implemented using proximity sensor 215 and locking mechanism 213 in self-propelled passenger platform 114.

The process begins by receiving input from an electronic device for a passenger for a self-propelled passenger platform (operation 800). This input may be in the form of a radio frequency identification tag unique to the passenger. This tag may be, for example, in an electronic boarding pass or other device. A determination is made as to whether the passenger is within a desired proximity of the self-propelled passenger platform (operation 802). A desired proximity may be while the passenger is sitting on the platform, while the passenger is within a desired number of feet from the platform, some other measure of proximity, or a combination thereof.

If the passenger is within the desired proximity of the self-propelled passenger platform, the self-propelled passenger platform continues along the route for the passenger (operation 804) with the process returning to operation 800.

With reference again to operation 802, if the passenger is not within the desired proximity of the self-propelled passenger platform, the self-propelled passenger platform and the luggage system is locked (operation 806). A locking mechanism may lock the movement system for the self-propelled passenger platform and the luggage system on the self-propelled passenger platform to prevent unauthorized users from access to the self-propelled passenger platform. A determination is made as to whether the passenger has returned to an area within a desired proximity of the self-propelled passenger platform (operation 808). If the passenger is within a desired proximity of the self-propelled passenger platform, the locking mechanism is disengaged and the process returns to operation 804 as described above.

If the passenger is not within the desired proximity of the self-propelled passenger platform, a determination is made whether a desired amount of time has passed (operation 810). This desired amount of time may be an amount of time set by the passenger, or an amount of time designated by airport personnel. If the desired amount of time has passed, a determination is made whether any items are present in the luggage system (operation 812). If items are present in the luggage system, the process returns to operation 808. If items are not present in the luggage system, the self-propelled passenger platform returns to a loading area for use by another passenger (operation 814) with the process terminating thereafter.

With reference again to operation 810, if a desired amount of time has not passed, the process returns to operation 808 as described above.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in FIG. 7, other types of operations may be controlled through user input by a passenger of self-propelled passenger platform. For example, additional options may be presented to speed up or slow down the self-propelled passenger platform within desired speed limits.

In another alternative implementation for an illustrative embodiment, self-propelled passenger platform 400 in FIG. 4 and self-propelled passenger platform 500 in FIG. 5 may have alternative configurations other than those depicted in the figures. For example, self-propelled passenger platform 400 may be configured to provide a semi-seated design to accommodate older passengers who have trouble moving between seated and standing postures. In still other illustrative examples, self-propelled passenger platform 500 may have standing platforms, adjustable platforms, or a combination thereof.

In still yet other illustrative examples, the self-propelled passenger platform 400 may include desired ergonomic features. Ergonomic features for self-propelled passenger platform 400 may be selected to take into account age, mobility, and health considerations of the passenger. Some ergonomic features for self-propelled passenger platform 400 may include features specific to a particular type of passenger or may include features that may be adjustable. For example, without limitation, the design of self-propelled passenger platform 400 may include additional skeletal support, alternative implementations for a user interface, additional passenger safety mechanisms, or alternative implementations for alerts or symbols.

Figure 9:
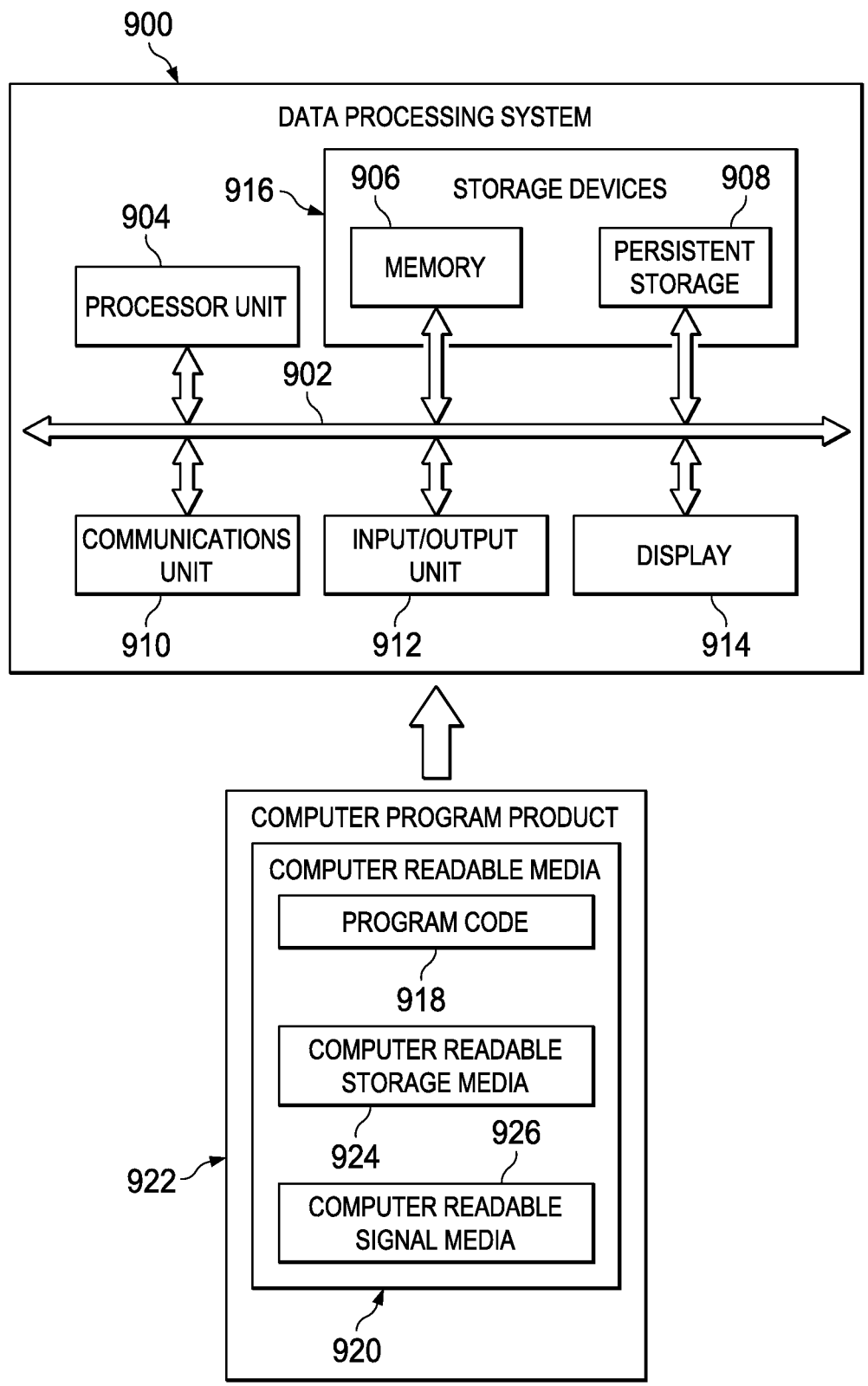
FIG. 9 is an illustration of a data processing system in accordance with an illustrative embodiment.

Turning now to FIG. 9, an illustration of a data processing system is depicted in accordance with an illustrative embodiment. Data processing system 900 may be used to implement computer system 220 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code 918.

Thus, the illustrative embodiments provide a passenger transportation system that moves passengers to different locations in a facility, such as an airport. In particular, one or more illustrative embodiments may be implemented in an airport to move passengers who may need assistance to gates for travel. Further, the passenger transportation system also may be used to move passengers arriving at a gate to baggage areas, exits, or other areas in or around the airport.

In these illustrative embodiments, a self-propelled passenger platform may be used by one or more passengers to travel to a gate. The self-propelled passenger platform is configured to generate a route to the gate as well as points of interest that may be selected by the passenger. The self-propelled passenger platform navigates itself along the route without needing input from the passenger. In other words, the passenger does not need to, and often may not be allowed to, steer the self-propelled passenger platform.

With the self-propelled passenger platform, passengers with reduced mobility may more easily move to different locations within the airport. Further, passengers who are unfamiliar with the airport, or unable to move as quickly as needed to reach a gate may use the self-propelled passenger platform to reach their gate.

Further, in accordance with an illustrative embodiment, passengers may travel efficiently to a desired destination while appending the actions of the mobile platform. Each route is configured for a particular passenger or set of passengers based on the flight information received for those passengers. The illustrative embodiments create the most efficient route while still allowing passengers to stop at desired waypoints within the airport. The illustrative embodiments provide desirable features as compared to the current mass transit systems within airports.

Additionally, with a self-propelled passenger platform configured in accordance with an illustrative embodiment, airport personnel or other personnel are not needed to provide transportation to passengers. Further, the self-propelled passenger platform may also provide a platform for advertising or providing information within the airport.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a mobile platform configured to hold a passenger;
a movement system associated with the mobile platform and configured to move the mobile platform;
a location system configured to identify a location of the mobile platform; and
a navigator configured to identify flight information for the passenger, generate a route to a gate for the passenger using the flight information, and control the movement system to move the mobile platform along the route using the location of the mobile platform, wherein an implementation of the navigator is selected from the group consisting of non-transitory software, hardware, or a combination of non-transitory software and hardware.

2. The apparatus of claim 1, wherein the navigator is configured to identify a set of points of interest in an airport from user input and wherein in being configured to generate the route to the gate for the passenger, the navigator is configured to generate the route to the gate, wherein the route includes the set of points of interest in the airport.

3. The apparatus of claim 2, wherein the route is comprised of waypoints and wherein each point of interest in the set of points of interest is a waypoint in the waypoints.

4. The apparatus of claim 1, wherein the navigator is configured to communicate with an electronic boarding pass device and receive the flight information for the passenger from the electronic boarding pass device.

5. The apparatus of claim 1, wherein the movement system comprises:
a propulsion system; and
a steering system.

6. The apparatus of claim 5, wherein the mobile platform has wheels and wherein the propulsion system comprises:
a number of electric motors connected to a number of the wheels.

7. The apparatus of claim 6, wherein the steering system comprises:
a number of controllers configured to control the number of electric motors.

8. The apparatus of claim 1, wherein the location system comprises:
a global positioning system receiver.

9. The apparatus of claim 1 further comprising:
an object sensor system comprising a sensor configured to detect objects, wherein the navigator is configured to receive object detection information from the object sensor system and to avoid the objects on the route.

10. The apparatus of claim 1 further comprising:
a luggage system associated with the mobile platform, wherein the luggage system is configured to alert the passenger when luggage is left in the luggage system.

11. The apparatus of claim 10 further comprising:
a proximity sensor system comprising a radio frequency identification receiver, wherein the proximity sensor system is configured to monitor the luggage system and to alert the passenger when the luggage is left in the luggage system.

12. The apparatus of claim 1 further comprising:
a proximity sensor system having a proximity sensor and a locking mechanism, the proximity sensor comprising a radio frequency identification receiver, wherein the proximity sensor is configured to detect a proximity of the passenger to the mobile platform using a radio frequency identification tag given to the passenger, and the locking mechanism is configured to secure the mobile platform or a luggage system when the proximity sensor detects a change.

13. The apparatus of claim 1, wherein the mobile platform is selected from one of a wheelchair, a cart, and a two-wheeled self-balancing personal transport platform.

14. A self-propelled passenger platform comprising:
a mobile platform configured to hold a passenger;
a movement system associated with the mobile platform and configured to move the mobile platform;
a location system configured to identify a location of the mobile platform; and
a navigator configured to identify flight information for the passenger, identify points of interest, generate a route to a gate and a set of points of interest in response to user input selecting the set of points of interest, and control the movement system to move the mobile platform along the route using the location of the mobile platform, wherein an implementation of the navigator is selected from the group consisting of non-transitory software, hardware, or a combination of non-transitory software and hardware.

15. The self-propelled passenger platform of claim 14, wherein the self-propelled passenger platform is configured to return to a loading station automatically when the passenger is not detected on or near the self-propelled passenger platform for a desired amount of time.

16. A method of operating a self-propelled passenger platform, the method comprising:
identifying flight information for a passenger with a navigator, wherein an implementation of the navigator is selected from the group consisting of non-transitory software, hardware, or a combination of non-transitory software and hardware;
generating with the navigator a route from a location of a mobile platform to a gate identified from the flight information; and
controlling with the navigator operation of a movement system associated with the mobile platform such that the mobile platform moves along the route.

17. The method of claim 16 further comprising:
identifying a set of points of interest from user input, wherein generating the route from the location of the mobile platform to the gate identified from the flight information comprises:
generating the route from the location of the mobile platform to the gate identified from the flight information, wherein the route includes the set of points of interest.

18. The method of claim 16, wherein identifying the flight information for the passenger comprises:
receiving the flight information from an electronic device.

19. The method of claim 16 further comprising:
avoiding objects on the route detected by an object sensor system for the mobile platform while moving the mobile platform to the gate, wherein the object sensor system comprises a sensor.

20. The method of claim 16, wherein the mobile platform includes a luggage system associated with the mobile platform; and
the method further comprises:
monitoring the luggage system with a proximity sensor system comprising a radio frequency identification receiver; and
alerting the passenger with the proximity sensor system when luggage is left in the luggage system.

21. The method of claim 16, wherein controlling the operation of the movement system associated with the mobile platform further comprises:
- identifying whether the passenger is present within a desired proximity of the mobile platform by using a proximity sensor comprising a radio frequency identification receiver, wherein the passenger has a radio frequency identification tag; and
- locking the mobile platform until the passenger returns to an area within the desired proximity of the mobile platform.

22. The method of claim 16, wherein the mobile platform is selected from one of a wheelchair, a cart, and a two-wheeled self-balancing personal transport platform.

* * * * *